United States Patent [19]
Tomita

[11] Patent Number: 5,440,408
[45] Date of Patent: Aug. 8, 1995

[54] IMAGE DATA PROCESSING APPARATUS HAVING A DIGITAL COPYING FUNCTION AND A FACSIMILE FUNCTION AND INCLUDING MEANS FOR DISTINGUISHING A FACSIMILE RECEPTION SHEET FROM A COPY SHEET

[75] Inventor: Kan Tomita, Tokyo, Japan

[73] Assignee: Ricoh Company, Ltd., Tokyo, Japan

[21] Appl. No.: 165,907

[22] Filed: Dec. 14, 1993

[30] Foreign Application Priority Data

Dec. 15, 1992 [JP] Japan .................. 4-334472
Feb. 24, 1993 [JP] Japan .................. 5-034981

[51] Int. Cl.⁶ ................ H04N 1/32; H04N 1/00/1/46
[52] U.S. Cl. ..................... 358/468; 358/434; 358/400; 358/500
[58] Field of Search ............... 358/468, 400, 401, 500, 358/501, 434, 435, 436, 437, 438, 439

[56] References Cited

U.S. PATENT DOCUMENTS 5,166,739 11/1992 Katsuki ................ 355/319
5,262,851 11/1993 Nakatani .............. 358/500
5,276,509 1/1994 Mizuno ................ 358/474

Primary Examiner—Edward L. Coles, Sr.
Assistant Examiner—Allan A. Esposo
Attorney, Agent, or Firm—Oblon, Spivak, McClelland, Maier & Neustadt

[57] ABSTRACT

An image data processing apparatus includes: a printing part responsive to image signals for printing an image in a plain sheet in one of black and a different color based on a selection signal; a facsimile part for transmitting facsimile data via a communication line and for receiving facsimile data via the communication line; an image signal part for converting the received facsimile data into image data and for processing the image data to produce image signals indicating a facsimile reception image; a reading part for reading a copy image from a sheet by optically scanning the sheet and for producing image signals indicating the copy image; and a color setting part for setting a selection signal relating to each of image signals of a given pattern to a first value indicating the color if the image signals are received and for supplying the image signals and the respective selection signals to the printing part, and for setting a selection signal relating to each of the image signals of the reading part to a second value indicating black and for supplying the image signals and the respective selection signals to the printing part.

13 Claims, 9 Drawing Sheets

IMAGE DATA PROCESSING APPARATUS HAVING A DIGITAL COPYING FUNCTION AND A FACSIMILE FUNCTION AND INCLUDING MEANS FOR DISTINGUISHING A FACSIMILE RECEPTION SHEET FROM A COPY SHEET

BACKGROUND OF THE INVENTION

The present invention generally relates to an image data processing apparatus, and more particularly to an image data processing apparatus having a digital copying function and a facsimile function.

Several digital copiers have been developed. Among these digital copiers, an image data processing apparatus having a digital copying function and a facsimile function is the main trend in development. The recent development has made possible a copying function to print an image read from a document in two colors: black and a different color.

There are many facsimile machines which have the function to print a recipient user name, a recipient telephone number and a reception date and time at an edge portion of a sheet when facsimile data is received from a transmitting facsimile station via a communication line. A facsimile machine of a certain type has a facsimile function and a copying function, and it can use plain sheets for printing a copy image and for printing a facsimile reception image. With the facsimile machine of this type, the user often encounters a difficulty in distinguishing a facsimile reception sheet in which a facsimile image is printed and a copy sheet in which a document image is printed. In order to easily distinguish a facsimile reception sheet and a copy sheet with the facsimile machine of this type, one can use a special color sheet as the facsimile reception sheet and a plain sheet as the copy sheet.

A digital copier of a certain type has a facsimile function to print out both a facsimile reception image and a document image using plain sheets. With the digital copier mentioned above, the user is likely to encounter the difficulty in distinguishing a facsimile reception sheet and a copy sheet. As described above, one can use a special color sheet as the facsimile reception sheet and a plain sheet as the copy sheet in order to easily distinguish the facsimile reception sheet and the copy sheet with such a digital copier. However, this is not convenient to the user, and the maintenance cost of the digital copier is increased, as the use of color sheets and plain sheets in a single apparatus requires additional cost and time.

SUMMARY OF THE INVENTION

Accordingly, it is a general object of the present invention to provide a novel and useful image data processing apparatus in which the above mentioned problems are eliminated.

Another, more specific object of the present invention is to provide an image data processing apparatus having a digital copying function and a facsimile function which apparatus prints an image in a plain sheet in black if the digital copying function is used, and prints an image in a plain sheet in a different color if the facsimile function is used, so that the user can easily distinguish a sheet in which a facsimile reception image is printed from a sheet in which a copy image is printed with no need of an increase of the maintenance cost.

The above mentioned objects of the present invention are achieved by an image data processing apparatus which includes: a printing part responsive to image signals for printing an image in a plain sheet in one of black and a different color based on a selection signal relating to each of the image signals; a facsimile part for transmitting facsimile data to a receiving station via a communication line, and for receiving facsimile data from a transmitting station via the communication line; an image signal part for converting the facsimile data received by the facsimile part into image data, and for processing the image data to produce image signals indicating a facsimile reception image; a reading part for reading a copy image from a sheet by optically scanning the sheet, and for producing image signals indicating the copy image; and a color setting part coupled to the image signal part and the reading part for setting a selection signal relating to each of image signals of a given pattern to a first value that indicates the color if the color setting part receives the image signals produced by the image signal part, and for supplying the image signals produced by the image signal part and the respective selection signals to the printing part, and for setting a selection signal relating to each of the image signals produced by the reading part to a second value that indicates black, and for supplying the image signals produced by the reading part and the respective selection signals to the printing part.

According to the present invention, the user can easily distinguish a facsimile reception sheet and a copy sheet with the image data processing apparatus having the digital copying function and the facsimile function. As there is no need to use a special color sheet, the image data processing apparatus of the present invention is useful and convenient to the user.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given, with reference to FIG. 1, of a digital copier having the facsimile function to which the present invention is applied. The digital copier in FIG. 1 is capable of making a copy in which an image is printed in two or more colors including black and a specific color (e.g., red) different from black.

Figure 1:
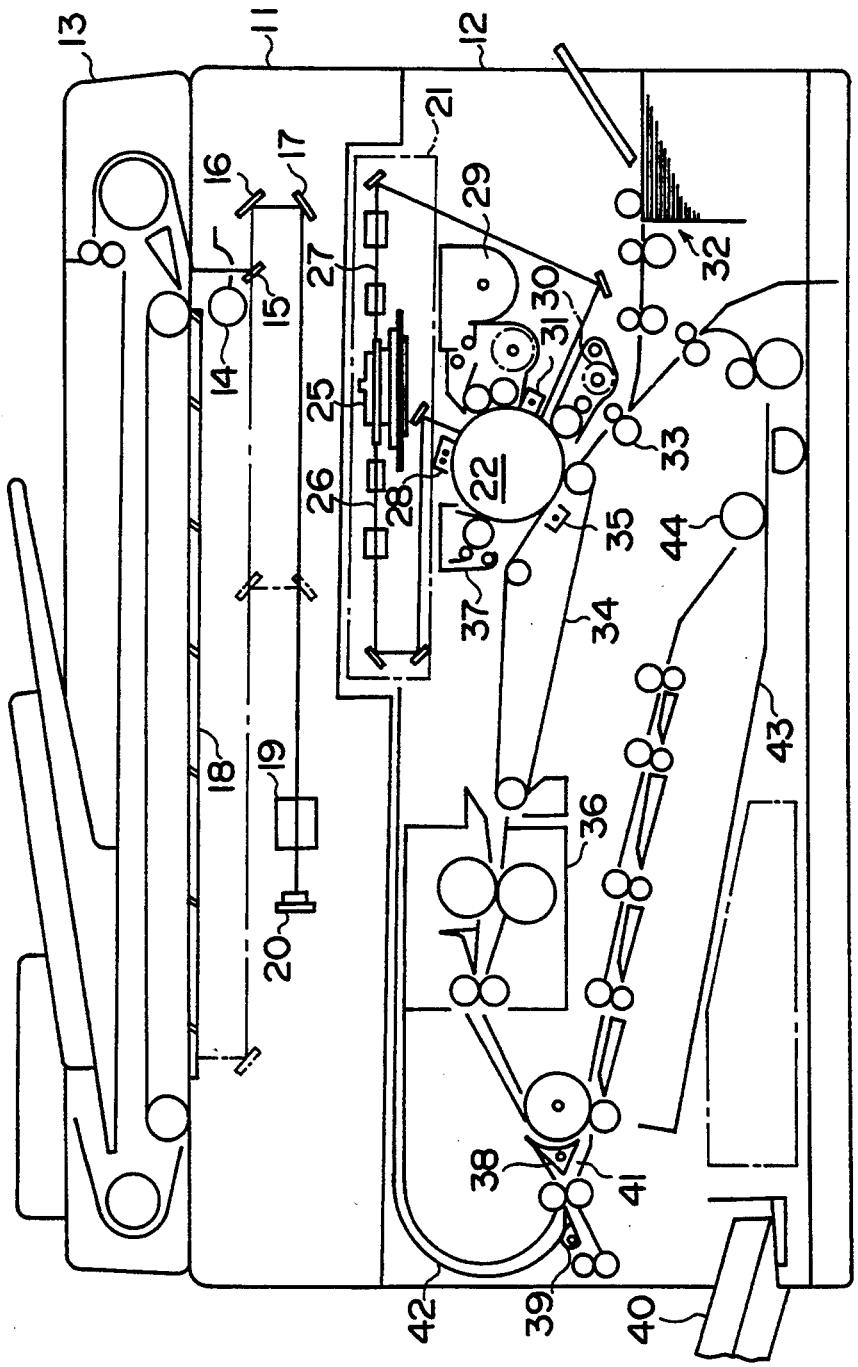
FIG. 1 is a sectional view showing a digital copier having a facsimile function to which the present invention is applied.

In FIG. 1, the digital copier comprises a main unit and an automatic document feeding (ADF) unit 13. The main unit has a scanner 11, an image processing unit and a plotter 12. In this digital copier, a document on a contact glass 18 is optically scanned to read an image from the document. The document is automatically set on the contact glass 18 by the ADF unit 13, or it is manually set on the contact glass 18 by hand.

The scanner 11 includes a first carriage and a second carriage. A document on the contact glass 18 is optically scanned by the first and second carriages. The first carriage has a light source 14 and a first mirror 15. The first carriage is moved relative to the document at a first moving rate by a scanner servo motor (not shown) at the time of the optical scanning of the document. The second carriage has a second mirror 16 and a third mirror 17. The second carriage is moved at a second moving rate, which is half of the first moving rate, by the scanner servo motor at the time of the optical scanning of the document.

At the time of the optical scanning by the scanner 11, the document on the contact glass 18 is illuminated by light emitted by the light source 14. The light reflected from the document is deflected in several ways by the first mirror 15, the second mirror 16 and the third mirror 17. The light deflected by the third mirror 17 passes through a lens 19, and it forms a converging light. This converging light is directed to a number of light receiving elements 20. The converging light is photoelectrically converted into image signals by the light receiving elements 20. The image signals produced by the light receiving elements 20 indicate a document image described by picture elements, and the picture elements indicated by the image signals are in one of two colors: black and a different color (e.g. red).

The light receiving elements 20 are, for example, a number of charged coupled devices (CCD) which are linearly arrayed along a line parallel to the width of the document being scanned. Each of the image signals output from the light receiving elements (CCD) 20 is supplied to the image processing unit.

The image signals indicating the document image, supplied from the light receiving elements (CCD) 20, are subjected to analog-to-digital (A/D) conversion, magnification, gamma-correction, gradation process, and two-color process within the image processing unit. The digital signals after the several image processing procedures are performed are supplied to the plotter 12.

In the digital copier in FIG. 1, a color filter (not shown) is removably arranged at an intermediate portion in the optical path from the contact glass 18 to the light receiving elements 20. The color filter serves to eliminate the undesired colors from the light reflected from the document, so that only the light of the desired colors is transmitted to the light receiving elements 20. This color filter is selectively arranged in the optical path in combination with the optical scanning of the document in order to achieve the multiple copying function or the two-sided copying function.

The plotter 12 of the digital copier in FIG. 1 comprises a writing unit 21 and a photosensitive drum 22. The digital signals indicating the document image output from the image processing unit are supplied to the writing unit 21. An electrostatic latent image is formed on the photosensitive drum 22 by the raster scanning of light emitted by the writing unit 21. The intensity of the light emitted by the writing unit 21 is controlled in accordance with the digital signals supplied from the image processing unit. The photosensitive drum 22 is illuminated by the light source of the writing unit 21 in the form of a plurality of light spots.

In the writing unit 21 in FIG. 1, two semiconductor laser diodes (LD) 23 and 24 are provided as the light sources for illuminating the photosensitive drum 22. Each of the laser diodes 23 and 24 emits a laser light, and the intensity of the laser light is controlled in accordance with each of the digital signals supplied from the image processing unit to the writing unit 21. The digital signals indicate picture elements for describing a document image. In the image data processing apparatus of the present invention, any document image can be printed in one of two colors: black and a different color (e.g., red).

The two laser light beams 26 and 27 emitted by the laser diodes 23 and 24 are incident to two reflection surfaces of a polygonal mirror 25 through a collimation lens. The laser light beams are deflected by two reflection surfaces of the polygonal mirror 25, and they are directed to the photosensitive drum 22 through an optical system. Each of the laser light beams 26 and 27 deflected by the reflection surfaces of the polygonal mirror 25 is the scanning light which scans the photosensitive drum 22 along a main scanning line while the polygonal mirror 25 is rotated.

A light detection sensor (not shown) located at a position outside the effective scanning range detects each of the laser light beams 26 and 27 supplied from the laser diodes 23 and 24 so that it outputs a sync signal. The sync signal output from the light detection sensor is used to control the start of the driving of each of the laser diodes 23 and 24 in synchronism with the rotation of the polygonal mirror 25.

The digital signals corresponding to one main scanning line, output from the image processing unit, are supplied to the writing unit 21 during a given time period (corresponding to a main scanning time) after the sync signal is output by the light detection sensor to the writing unit 21. The start of the main scanning of the laser light beam emitted by each of the laser diodes 23 and 24 over the photosensitive drum 25 is made synchronous with the time at which the sync signal is output to the writing unit 21. The laser diodes 23 and 24 are modulated in accordance with the digital signals corresponding to one main scanning line supplied to the writing unit 21. By repeating the above procedure, an electrostatic latent image in black and an electrostatic latent image in the other color can be formed by the laser diodes 23 and 24 on the photosensitive drum 22 in accordance with the digital signals supplied from the image processing unit to the writing unit 21. However, only one of the two latent images of the two colors is printed in a copy sheet at a time.

The photosensitive drum 22 is vertically rotated by a drive motor (not shown), the rotating axis of the photosensitive drum 22 extending in a horizontal direction perpendicular to the sheet of FIG. 1. After the surface of the photosensitive drum 22 is evenly charged by a charger 28, the photosensitive drum surface is exposed to the laser light beam 26 emitted by the laser diode 23 of the writing unit 21 so that an electrostatic latent image corresponding to a black component of the document image is formed on the photosensitive drum 22.

The photosensitive drum 22 is provided with a main developing unit 29 and a sub-developing unit 30. Each of the two developing units 29 and 30 has a developing roller to which a bias voltage from a power source is applied. The main developing unit 29 supplies a developing agent including black toner and carrier to the photosensitive drum 22 by using the developing roller, so that a visible black toner image corresponding to the latent image is formed on the photosensitive drum 22.

After the surface of the photosensitive drum 22 is evenly charged by a charger 31, the photosensitive drum surface is exposed to the laser light beam 27 emitted by the laser diode 24 of the writing unit 21 so that an electrostatic latent image corresponding to the color component of the document image is formed on the photosensitive drum 22. As described above, the latent image corresponding to the black component of the document image and this latent image corresponding to the color component overlap each other.

The sub-developing unit 30 supplies a developing agent including color toner (e.g. red) and carrier to the photosensitive drum 22 by using the developing roller, so that a visible red toner image corresponding to the latent image is formed on the photosensitive drum 22.

The main developing unit 29 and the sub-developing unit 30 are engaged with the developing positions of the photosensitive drum 22 when the developing positions corresponding to the black and red toner images are located in the vicinity of either of the main developing unit 29 and the sub-developing unit 30 during the rotation of the photosensitive drum 22. When the developing positions of the photosensitive drum 22 are separated from either the main developing unit 29 or the sub-developing unit 30, the main developing unit 29 and the sub-developing unit 30 are placed at waiting positions apart from the engaging positions. A combination of the above mentioned developing unit action, the document optical scanning, the color filter selection, the multiple copying, and the two-sided copying may achieve the multi-function color copying function or the multi-function color editing function.

In the digital copier in FIG. 1, copy sheets are supplied from a sheet supplying unit 32 one by one to a registration roller 33. The registration roller 33 supplies a copy sheet to the photosensitive drum 22 in a manner such that the leading edge of the copy sheet is synchronous with the leading edge of the toner image on the photosensitive drum 22. The copy sheet is transported by a transporting belt 34 to a transfer charger 35 in which the toner image is transferred from the photosensitive drum 22 to this copy sheet. The copy sheet is transported by the transporting belt 34 from the transfer charger 35 to a fixing unit 36. In this fixing unit 36, the toner image is fixed onto the copy sheet due to heat and pressure by the fixing unit 36.

The remaining toner of the photosensitive drum 22 is removed by a cleaning unit 37. The remaining electrostatic voltage of the photosensitive drum 22 is eliminated by a potential eliminating lamp (not shown). Thus, the photosensitive drum 22 can be again used to form another electrostatic latent image, and the image is transferred to the following copy sheet.

In a case in which the normal copying function is selected with the above described digital copier, the copy sheet is transported from the fixing unit 36 to an ejection tray 40 by means of selecting levers 38 and 39. In a case in which the multiple copying is selected, the copy sheet from the fixing unit 36 is transported in a lower transporting path 41 by means of the selecting lever 48. The copy sheet passed through the lower transporting path is again sent to the registration roller 33, and the copy sheet is supplied to the photosensitive drum 22 so that the transferring of toner image in another color and the fixing are carried out with the copy sheet in a similar manner.

In a case in which the two-sided copying is selected with the above described digital copier, the copy sheet from the fixing unit 36 is transported in a reversing path 42 by means of the selecting levers 38 and 39. The copy sheet is transported in the reverse direction from the reversing path 42 back to the lower transporting path 41 by means of the selecting lever 38. The copy sheet is sent to a re-feeding loop 43 so that the copy sheet is turned upside down. The copy sheet is then supplied by a transporting roller 44 to the registration roller 33, and the copy sheet is supplied to the photosensitive drum 22, so that the toner image transferring and the fixing are carried out with the reverse side of the copy sheet in a similar manner.

Figure 2:
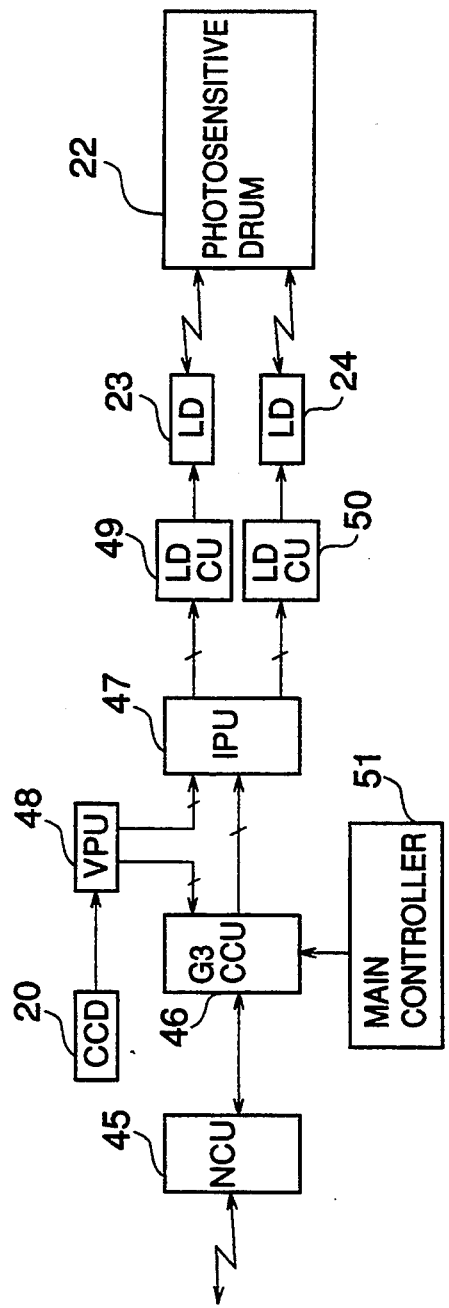
FIG. 2 is a block diagram showing a facsimile control part of the digital copier in FIG. 1.

FIG. 2 shows a facsimile control part of the image data processing apparatus according to the present invention. This facsimile control part comprises a network control unit (NCU) 45, a communication control unit (CCU) 46, and a first image processing unit (IPU) 47. The specifications of the CCU 46 may be in conformity with the group-3 (G3) facsimile standard. After the NCU 45 is connected to a transmitting facsimile station (not shown), the CCU 46 receives facsimile data from the transmitting facsimile station via a communication line. The CCU 46 decodes the received facsimile data into image data, and the CCU 46 supplies the decoded data to the IPU 47.

The image data processing apparatus comprises the above mentioned CCD 20 and a second image processing unit (VPU) 48. In the case of the normal copying function being selected, the CCD 20 supplies the image signals of the two colors, produced from a document image, to the VPU 48. The two-color image signals supplied from the CCD 20 are subjected to the analog-to-digital conversion, the shading correction and the other image processing within the VPU 48. After the image processing is performed by the VPU 48, the VPU 48 supplies the image signals to the first image processing unit (IPU) 47.

In the case of the facsimile function being selected with the image data processing apparatus, a document to be transmitted is optically scanned by the scanner 11 to read an image from the document. The CCD 20 supplies image signals of black indicating the document, to the VPU 48. The black image signals supplied from the CCD 20 are subjected to the analog-to-digital conversion, the shading correction and the other image processing within the VPU 48. After the image processing is performed by the VPU 48, the VPU 48 supplies the image signals to the CCU 46. The image signals supplied from the VPU 48 are subjected to an encoding process within the CCU 46. The CCU 46 encodes the image data, received from the VPU 48, into facsimile data in a form that can be transmitted through a communication line. After a reception facsimile station is connected to the NCU 45, the facsimile data is transmitted from the CCU 46 to the reception facsimile station via the communication line.

Figure 3:
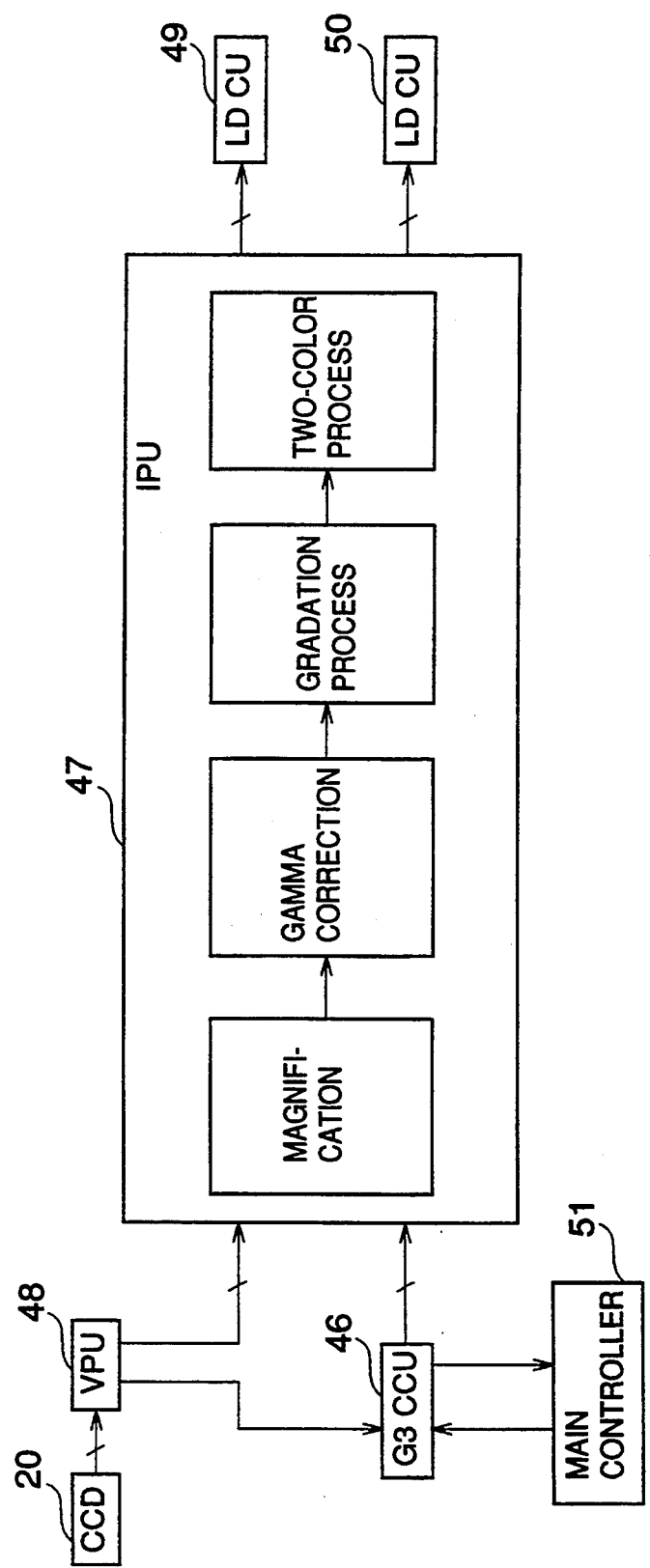
FIG. 3 is a block diagram showing an image processing unit of the facsimile control part in FIG. 2.

FIG. 3 shows the construction of the first image processing unit (IPU) 47 of the facsimile control part in FIG. 2. The image signals supplied from either the CCU 46 or the VPU 48 are subjected to the magnification, the gamma correction, the gradation process, and the two-color process within the IPU 47. The two-color process is performed by the IPU 47 to detect whether the received image signal is the black image signal or the color image signal based on a selection signal.

After the two-color process is performed by the IPU 47, the IPU 47 outputs the image signal to one of two laser diode control units (LDCU) 49 and 50 which is selected in accordance with the selection signal. The selected LDCU turns on the selected laser diode (one of the two laser diodes 23 and 24) so that an image is formed in one of the two colors on the photosensitive drum 22. The intensity of the laser light emitted by the laser diode is controlled by the LDCU in accordance with the image signal supplied from the IPU 47.

As the result of the two-color process mentioned above, the IPU 47 detects whether the received image signal is the black image signal or the color image signal based on the selection signal, as follows. Each of the digital image signals received from the CCU 46 or the VPU 48 has seven bits of data. With this image signal, any one of 128 gradation levels can be defined. One additional bit relating to the selection signal mentioned above is added to the most significant bit (MSB) of the 7-bit image signal to form an 8-bit image signal. Thus, this 8-bit image signal comprises the one-bit selection signal and the received seven-bit image signal.

The IPU 47 supplies the image signal to one of the two LDCU 49 and 50 in accordance with the value of the selection signal. If the selection signal (or the leftmost bit of the image signal received from the CCU 46) is equal to 1, the IPU 47 detects that the received image signal is the color image signal. The IPU 47 outputs the image signal to the LDCU 50 so that an image is formed in the color (e.g., red) on the photosensitive drum 22. If the selection signal is equal to 0, the IPU 47 detects that the received image signal is the black image signal. The IPU 47 outputs the image signal to the LDCU 49 so that an image is formed in black on the photosensitive drum 22.

Figure 4:
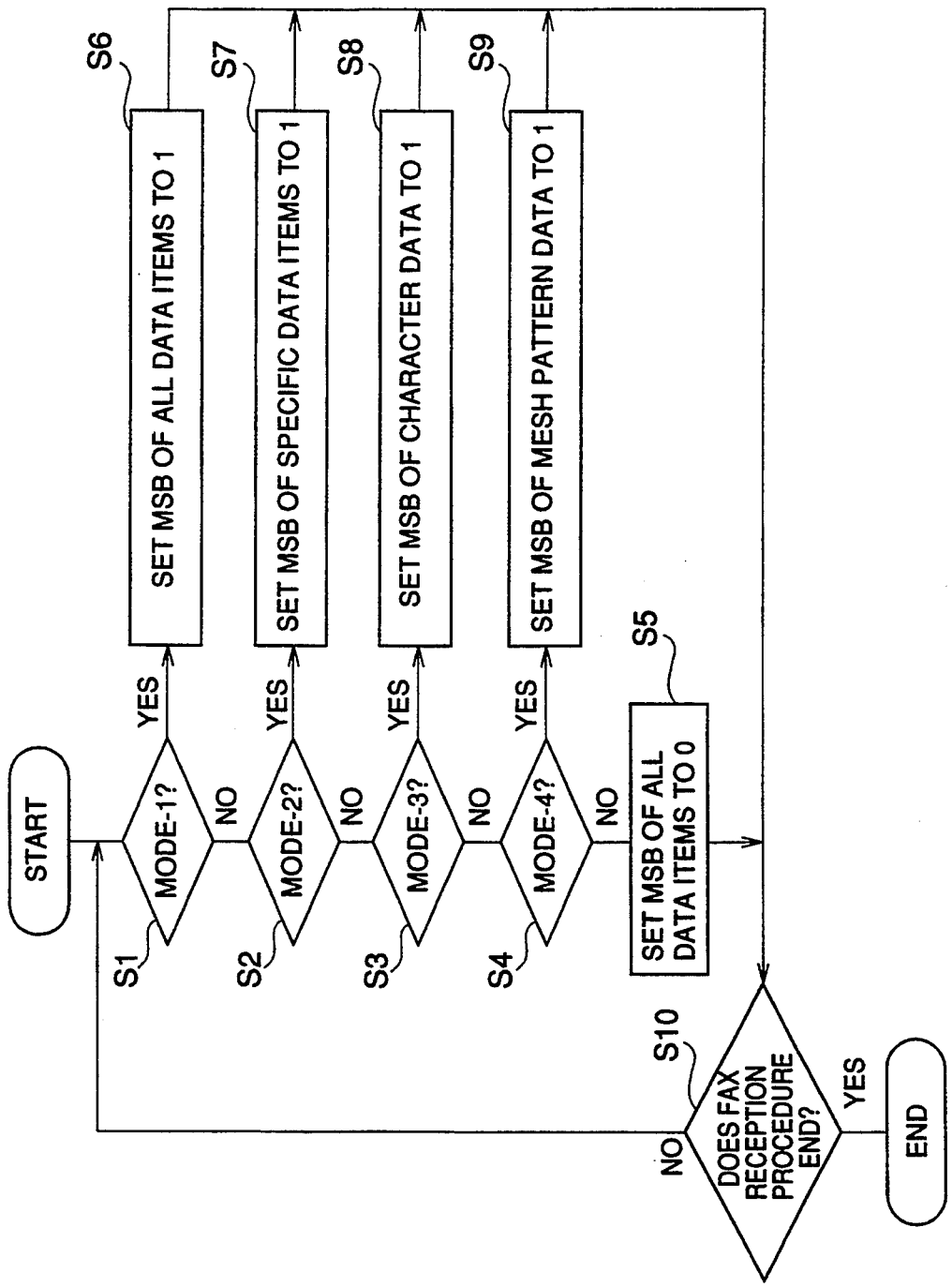
FIG. 4 is a flow diagram for explaining a facsimile reception procedure performed by a communication control unit with a main controller.
Figure 5:
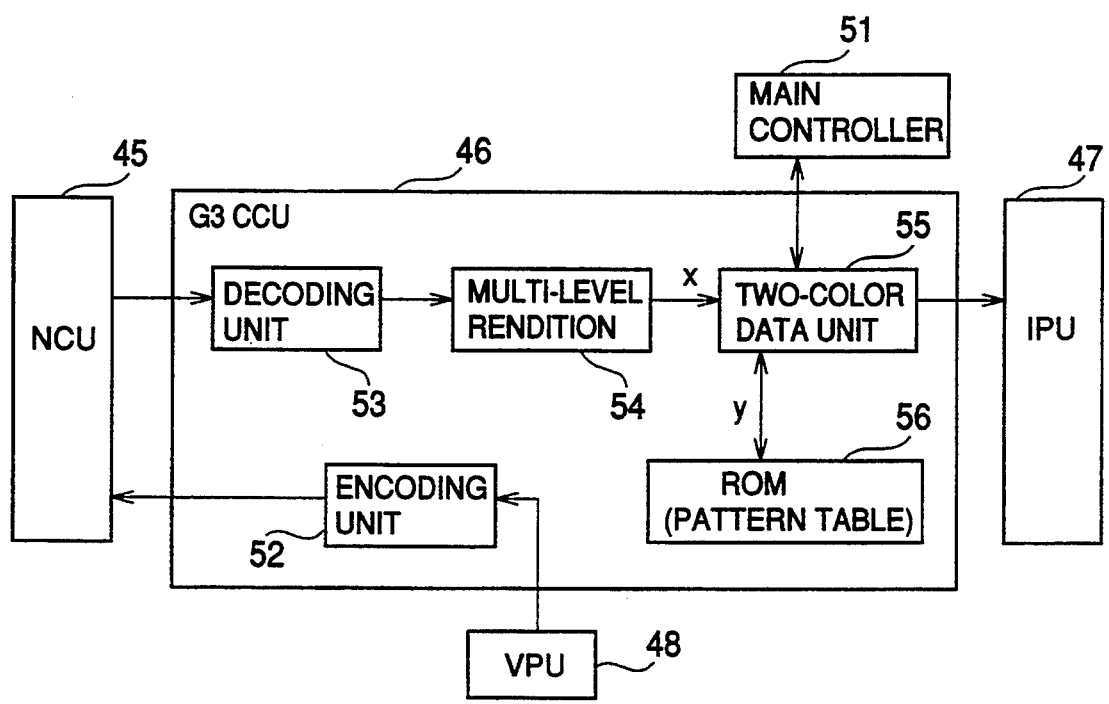
FIG. 5 is a block diagram showing a communication control unit of the facsimile control part in FIG. 2.

FIG. 4 shows a facsimile reception procedure performed by the communication control unit (CCU) with a main controller 51. FIG. 5 shows the CCU 46 of the facsimile control part in FIG. 2. In the facsimile control part in FIG. 5, the CCU 46 is connected to the main controller 51.

In FIG. 5, the CCU 46 comprises an encoding unit 52, a decoding unit 53, a multi-level rendition unit 54, a two-color data unit 55, and a read only memory (ROM) 56. A pattern table including prescribed pattern data such as a character pattern or a mesh pattern is stored in the ROM 56, and the two-color data unit 55 is coupled to the ROM 56 to gain access to the pattern table. The two-color data unit 55 of the CCU 46 is connected to the main controller 51. In the case of the facsimile transmission procedure, the image signals are supplied from the VPU 48 to the encoding unit 52. The image signals are encoded by the encoding unit 52 into facsimile data, and the facsimile data is transferred from the CCU 46 to the NCU 45.

In the case of the facsimile reception procedure, one of several facsimile reception modes can be selected by the user from the main controller 51. The main controller 51 is provided with an operation part from which the user can input the selection mode.

Five facsimile reception modes: mode-1 through mode-4 and a normal mode are available with the operation part of the main controller 51. If one of these facsimile reception modes is selected by the user, the main controller 51 detects which one of the five facsimile reception modes is selected by the user, and it supplies a detection signal indicating the selected mode to the CCU46.

In the facsimile reception procedure in FIG. 4, step S1 detects whether or not the mode-1 is selected. If the result at step S1 is affirmative, step S6 is performed (the mode-1 is selected). Step S6 sets the most significant bit (MSB) of all data items, received from the multi-level rendition unit 54, to 1. More specifically, the facsimile data received from the NCU 45 is subjected to the decoding process by the decoding unit 53 so as to produce image signals indicating a facsimile reception image through the decompression of the received facsimile data. The image signals are subjected to the multi-level rendition by the multi-level rendition unit 54. The thus processed image signals are supplied from the multi-level rendition unit 46 to the two-color data unit 55. At the two-color data unit 55, the MSB of each of the image data items received from the multi-level rendition unit 54 is set to 1, that indicates the different color in the present embodiment. Each of the image signals with the 1-bit selection signal added is supplied from the two-color data unit 55 to the IPU 47. Each of the image signals supplied from the CCU 46 to the IPU 47 is subjected to the two-color process within the IPU 47 to detect whether the received image signal is the black color signal or the color image signal. In the present case, the IPU 47 detects that the received image signal is the color image signal, and the image signal is supplied from the IPU 47 to the LDCU 50. Thus, an image of the color is formed on the photosensitive drum 22 by means of the laser diode 24. The plotter 12 outputs a sheet wherein an image relating to all the data items of a facsimile reception sheet is printed in the color.

Figure 6:
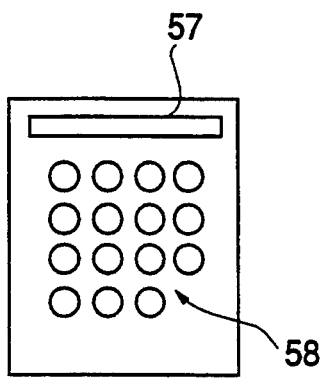
FIGS. 6 through 8 are diagrams showing examples of facsimile reception images printed by a plotter of the facsimile control part in FIG. 2.

If the result at step S1 is negative, step S2 is performed. Step S2 detects whether or not the mode-2 is selected. If the result at step S2 is affirmative (the mode-2 is selected), step S7 sets the MSB of each of specific data items, included in the facsimile data received from the multi-level rendition unit 54, to 1. The specific data items are a recipient user name, a recipient telephone number and a reception date and time. In the present case, the IPU 47 detects that the received image signal relating to the above specific data items is the color image signal, and the image signal is supplied from the IPU 47 to the LDCU 50. The IPU 47 detects that the received image signal relating to data items different from the above specific data items is the black image signal, and the image signal is supplied from the IPU 47 to the LDCU 49. Thus, the plotter 12 outputs a sheet shown in FIG. 6 wherein an image 57 relating to the specific data items (such as the recipient user name, the recipient telephone number and the reception date and time) is printed in the color, and a facsimile reception image 58 relating to the data items (other than the specific data items) received from the multi-level rendition unit 54 is printed in black.

Figure 7:
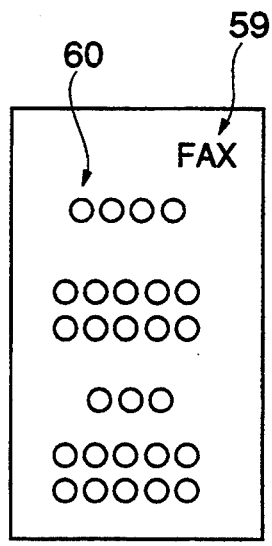

If the result at step S2 is negative, step S3 detects whether or not the mode-3 is selected. If the result at step S3 is affirmative, step S8 is performed (the mode-3 is selected). Step S8 reads out a given character pattern (e.g. "FAX") from the ROM 56, and sets the MSB of each of the data items read from the ROM 56 to 1. In the present case, the IPU 47 detects that the image signal relating to each of the above data items is the color image signal, and the image signal is supplied from the IPU 47 to the LDCU 50. The IPU 47 detects that the image signal relating to the data items (which are different from the above character pattern) received from the multi-level rendition unit 54 is the black image signal, and the image signal is supplied from the IPU 47 to the LDCU 49. Thus, the plotter 12 outputs a sheet shown in FIG. 7 wherein an image 59 relating to the character pattern such as "FAX" is printed in the color at a given location of the image and a facsimile reception image 60 relating to the data items (which are different from the character pattern) received from the multi-level rendition unit 54 is printed in black.

Figure 8:
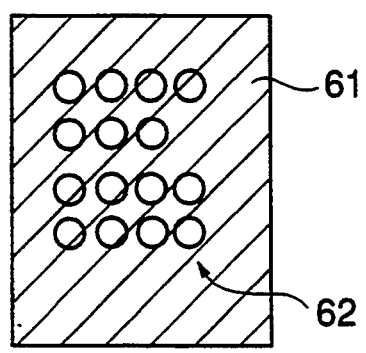

If the result at step S3 is negative, step S4 detects whether or not the mode-4 is selected. If the result at step S4 is affirmative (the mode-4 is selected), step S9 reads out a given mesh pattern from the ROM 56, and sets the MSB of each of the data items, read from the ROM 56, to 1. In the present case, the IPU 47 detects that the image signal relating to the above mesh pattern is the color image signal, and the image signal is supplied from the IPU 47 to the LDCU 50. The IPU 47 detects that the image signal relating to the data items (different from the above mesh pattern) received from the multi-level rendition unit 54 is the black image signal, and this image signal is supplied from the IPU 47 to the LDCU 49. Thus, the plotter 12 outputs a sheet shown in FIG. 8 wherein an image 61 of the mesh pattern, appearing in the entire sheet, is printed in the color and a facsimile reception image 62 relating to the data items received from the multi-level rendition unit 54 is printed in black.

If the results at all of the above steps S1–S4 are negative, step S5 sets the MSB of all the data items received from the multi-level rendition unit 54 to 0. The present case is the normal mode of the facsimile reception. The IPU 47 detects that the image signal relating to all the data items is the black image signal, and the image signal is supplied from the IPU 47 to the LDCU 49. Thus, the plotter 12 outputs a sheet wherein a facsimile reception image is printed in black.

In the facsimile reception procedure in FIG. 4, after any of the above steps S6–S9 is performed, or after the above step S5 is performed, step S10 detects whether or not the facsimile reception procedure ends. If the result at step S10 is negative, the above step S1 is repeated. On the other hand, if the result at step S10 is affirmative, the facsimile reception procedure in FIG. 4 is finished.

Figure 9:
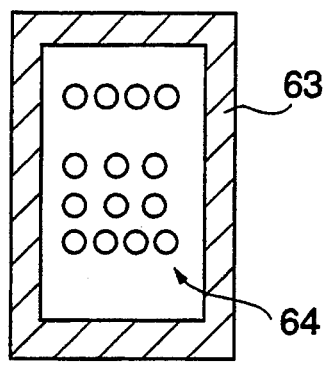
FIG. 9 is a diagram showing another example of the facsimile reception image printed by the plotter of the facsimile control part in FIG. 2.

The above described mode-3 case in the facsimile reception procedure in FIG. 4 can be modified in order to allow the user to more easily distinguish a facsimile reception sheet and a copy sheet. A description will be given of a modified facsimile reception procedure (relating to the mode-3 case) performed by the two-color data unit 55 of the CCU 46 in FIG. 5. If the mode-3 is selected from the main controller 51, the two-color data unit 55 reads out a pattern of repeated characters from the ROM 56, and sets the MSB of each of the pattern data items to 1. This pattern of repeated characters is printed on the peripheral portions of a sheet. The two-color data unit 55 adds the pattern data to the facsimile data received from the multi-level rendition unit 54, and supplies the facsimile data with the added pattern data, to the IPU 47. Thus, the plotter 12 outputs a sheet shown in FIG. 9 wherein an image 63 of the added character pattern appearing on the peripheral portions of the sheet is printed in the color and a facsimile reception image 64 relating to the data items received from the multi-level rendition unit 54 is printed in black.

In the above described mode-3 case in the facsimile reception procedure in FIG. 4, there is a problem in that the added character pattern image 59 and the facsimile reception image 60 may overlap each other. If the character pattern image 59 is printed in preference to the facsimile reception image 60, the content of the facsimile reception image 60 is not easily read. In order to eliminate this problem, the CCU 46 in FIG. 5 can perform a modified facsimile reception procedure.

Figure 10:
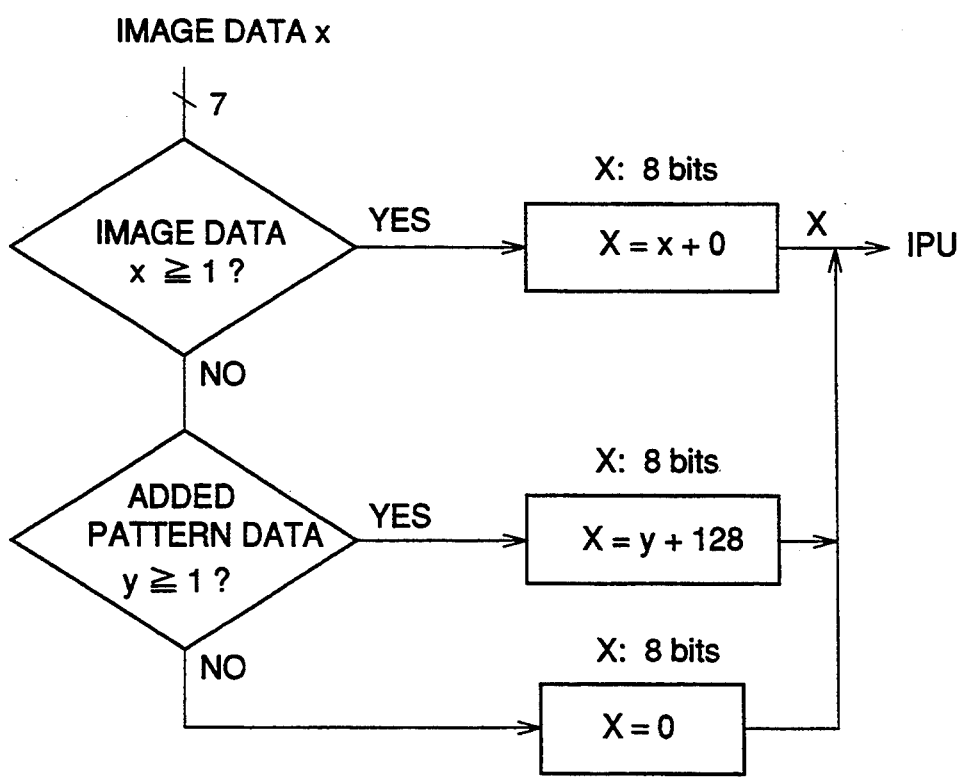
FIG. 10 is a flow diagram for explaining a modified facsimile reception procedure performed by a two-color data unit of the facsimile control part in FIG. 5.

FIG. 10 shows this modified facsimile reception procedure performed by the CCU 46 in FIG. 5. If the mode-3 is selected, the two-color data unit 55 performs the modified steps shown in FIG. 10. If the 7-bit image data x received from the multi-level rendition unit 54 is equal to or greater than 1, the two-color data unit 55 sets the MSB of the 8-bit image data X to 0. The two-color data unit 55 supplies the image data X to the IPU 47, so that the plotter 12 outputs a sheet wherein a facsimile reception image 60 corresponding to the image data X is printed in black.

If the 7-bit image data x received from the multi-level rendition unit 54 is smaller than 1 ($x<1$), the two-color data unit 55 detects whether or not the added pattern data y is equal to or greater than 1. If the result of the detection is affirmative ($y \geq 1$), the two-color data unit 55 adds 128 to the pattern data y to produce the 8-bit image data X. The MSB of this image data X is set to 1. The two-color data unit 55 supplies the image data X to the IPU 47, so that the plotter 12 outputs a sheet wherein a character pattern image 59 corresponding to the image data X is printed in the color. On the other hand, if the result of the detection is negative ($y<1$), the two-color data unit 55 set the image data X to 0. The MSB of this image data X is equal to 0. The two-color data unit 55 supplies the image data X to the IPU 47, so that the plotter 12 prints the facsimile reception image 60 in black in preference to the character pattern image 59.

Accordingly, in the case of the modified facsimile reception procedure, it is possible to prevent the facsimile reception image 60 and the added character pattern image 59 from overlapping each other in a facsimile reception sheet if the mode-3 is selected. The user can easily read the content of the facsimile data from such a sheet.

Figure 11:
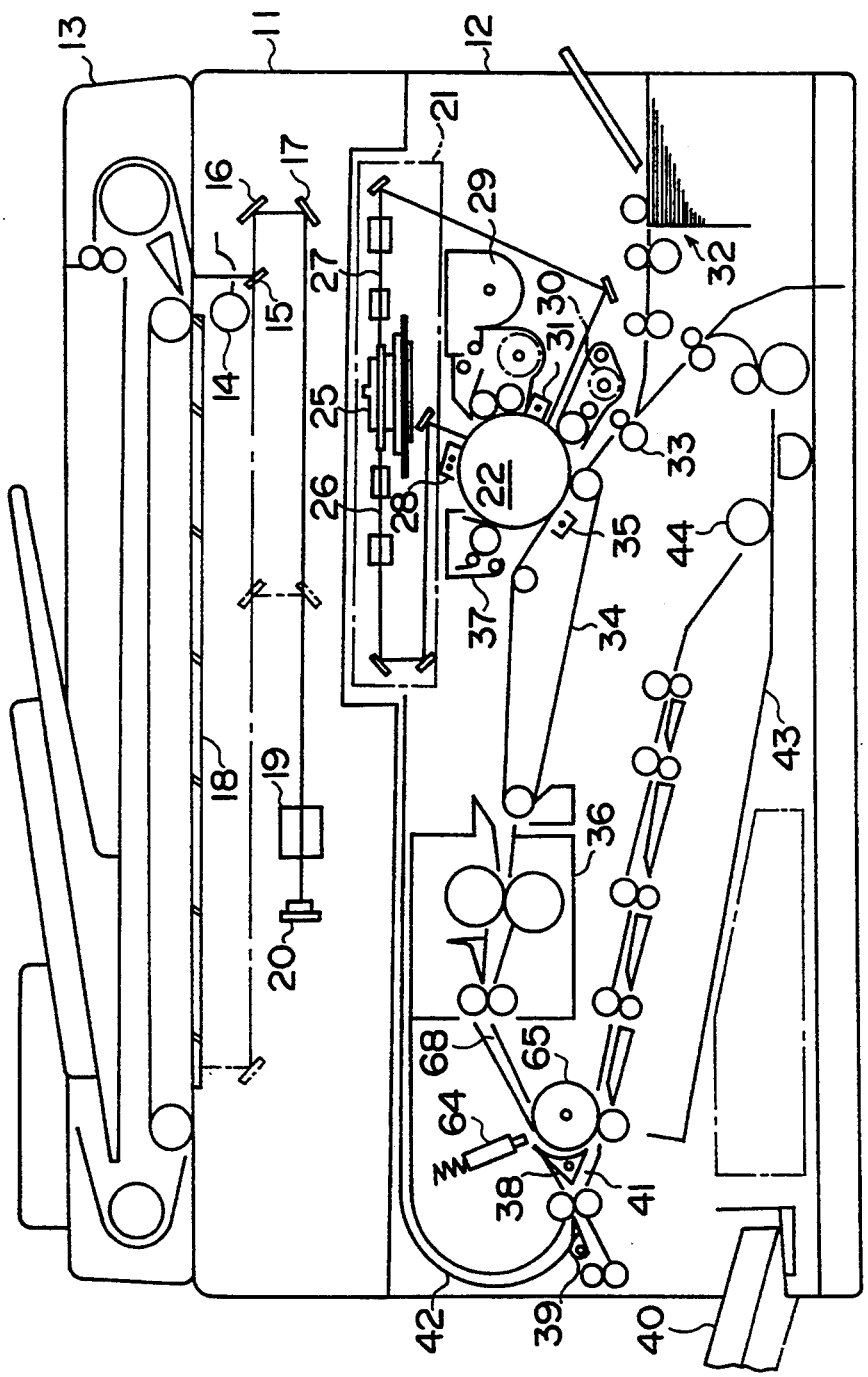
FIG. 11 is a sectional view showing a digital copier having a facsimile function to which a second embodiment of the present invention is applied.
Figure 12:
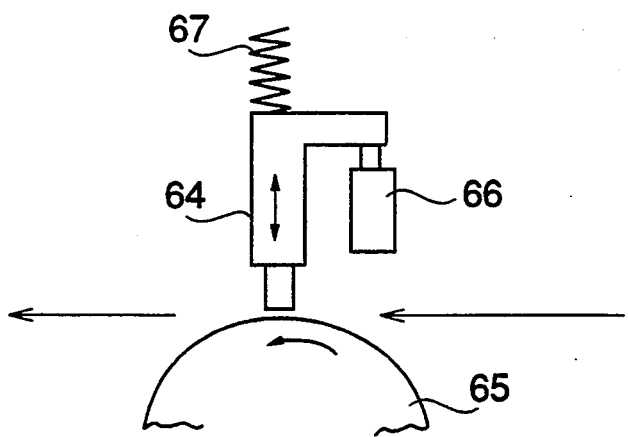
FIG. 12 is a diagram showing a mark pen provided within the digital copier in FIG. 11.

FIG. 11 shows a digital copier having the above described facsimile control part to which a second embodiment of the present invention is applied. FIG. 12 shows a mark pen provided within the digital copier in FIG. 11. In the digital copier in FIG. 11, a transporting roller 65 is arranged near the position where an ejecting path 68 and the lower transporting path 41 cross each other. The ejecting path 68 extends from the exit of the fixing unit 36 to the selecting lever 38. A retractable mark pen 64 is arranged in the ejecting path 68 at a position opposite to the transporting roller 65. As shown in FIG. 12, the mark pen 64 comprises a solenoid 66 and a spring 67 connected to the solenoid 66.

With the digital copier having the facsimile control part shown in FIG. 11, the above mentioned objects of the present invention can be achieved. In the case of the facsimile reception with the digital copier in FIG. 11, the solenoid 66 of the mark pen 64 is switched on while the leading edge of a sheet supplied from the fixing unit 36 is passing through the transporting roller 65. The mark pen 64 at this time is pressed onto the copy sheet due to the force of the spring 67 exerted by the solenoid 66. With this action of the mark pen 64, a marking in a color different from black which indicates the facsimile reception sheet is printed at the leading edge of the sheet.

When the solenoid 66 is switched off, the mark pen 64 retracts, and the leading edge of the mark pen 64 is separated from the transporting roller 65. With this mark pen 64, the above mentioned marking is not printed in the sheet which passes through the ejecting path 68. It is readily understood that, instead of the mark pen 64, another means for printing the above marking to a sheet if the sheet is the facsimile reception sheet may be provided in the digital copier.

Further, the present invention is not limited to the above described embodiments, and variations and modifications may be made without departing from the scope of the present invention.

What is claimed is:

1. An image data processing apparatus with a digital copying function and a facsimile function, said apparatus comprising:

printing means responsive to image signals for printing an image in a plain sheet in one of black and a different color based on a selection signal relating to each of the image signals;

facsimile means for transmitting facsimile data to a receiving station via a communication line, and for receiving facsimile data from a transmitting station via the communication line;

image signal means for converting the facsimile data received by said facsimile means into image data, and for processing the image data to produce image signals indicating a facsimile reception image;

reading means for reading a copy image from a document by optically scanning the document, and for producing image signals indicating the copy image; and color setting means coupled to said image signal means and said reading means for setting a selection signal relating to each of image signals of a given pattern to a first value that indicates the color if said color setting means receives the image signals produced by said image signal means, and for supplying the image signals produced by the image signal means and the respective selection signals to said printing means, and for setting a selection signal relating to each of the image signals produced by said reading means to a second value that indicates black if said color setting means receives the image signals produced by the reading means, and for supplying the image signals produced by the reading means and the respective selection signals to said printing means, wherein said color setting means sets a selection signal relating to each of image signals of a set of characters to the first value and sets a selection signal relating to each of the image signals indicating the facsimile reception image to the second value if said color setting means receives the image signals produced by said image signal means, wherein said color setting means comprises means for allowing said printing means to print the facsimile reception image in black in preference to an image of the set of characters if the facsimile reception image and the image of the set of characters overlap each other in the sheet.

2. An apparatus according to claim 1, wherein said color setting means comprises operation means for inputting one of a plurality of facsimile reception modes, which facsimile reception mode is selected by a user, and for supplying a signal indicating the selected facsimile reception mode to said color setting means.

3. An apparatus according to claim 1, wherein said color setting means sets a selection signal relating to each of the image signals produced by said image signal means to the first value if said color setting means receives the image signals produced by the image signal means, and supplies the image signals and the respective selection signals to said printing means.

4. An apparatus according to claim 1, wherein said color setting means sets a selection signal relating to each of image signals of predetermined data items included in the received facsimile data to the first value and sets a selection signal relating to each of the image signals indicating the facsimile reception image to the second value if said color setting means receives the image signals produced by said image signal means.

5. An apparatus according to claim 1, wherein said color setting means sets a selection signal relating to each of image signals of a given mesh pattern to the first value and sets a selection signal relating to each of the image signals indicating the facsimile reception image to the second value if said color setting means receives the image signals produced by said image signal means.

6. An apparatus according to claim 2, wherein said color setting means comprises memory means for storing a given pattern, and said color setting means reads out the given pattern from said memory means when a specific facsimile reception mode of the plurality of facsimile reception modes is selected and inputted from the operation means.

7. An apparatus according to claim 1, wherein said printing means comprises marking means for printing a marking indicating the facsimile reception in the sheet in a color different from black if said facsimile means receives facsimile data from a transmitting station via the communication line.

8. An apparatus according to claim 1, further comprising detection means coupled to said image signal means and said reading means for detecting whether each of image signals supplied from either said image signal means or said reading means indicates a facsimile reception image or a copy image.

9. An image data processing apparatus with a digital copying function and a facsimile function, said apparatus comprising:

printing means, responsive to selection data of image signals, for printing an image in a color other than black in accordance with said image signals when the selection data is set to a first value, and for printing an image in black in accordance with said image signals when the selection data is set to a second value;

facsimile means for transmitting facsimile data to and receiving facsimile data from an external station via a communication line;

image signal means for converting the facsimile data received by said facsimile means into image signals including selection data;

first color setting means for setting the selection data, of all of said image signals supplied from said image signal means, to the first value when facsimile data is received by said facsimile means, and for supplying said image signals including said selection data to said printing means so that an image of all of said received facsimile data is printed in said color in accordance with the supplied image signals; third color setting means for reading out image signals of a set of characters from a memory when facsimile data is received by said facsimile means, for setting selection data of each of the read image signals to the first value and setting the selection data of all of said image signals supplied from said image signals means, to the second value, and for supplying the read image signals of said set of characters and the image signals of the received facsimile data to said printing means so that an image of the read image signals is printed in said color at a predetermined location on a sheet and an image of the received facsimile data is printed in black on said sheet in accordance with the supplied image signals, wherein said third color setting means comprises means for allowing said printing means to print an image of the received facsimile data in black in preference to an image of the read image signals when the facsimile data image and the image of the set of characters overlap each other on said sheet.

10. An image data processing apparatus according to claim 9, further comprising:

operation means for inputting one of a plurality of facsimile receiving modes, said one of the facsimile receiving modes being selected by a user; and detecting means, coupled to said first color setting means, for detecting that the selected facsimile receiving mode is a first mode, and for allowing said first color setting means to set said selection data to the first value and supply said image signals to said printing means.

11. An image data processing apparatus according to claim 9, further comprising second color setting means for setting the selection data, of each of predetermined data items included in said image signals supplied from said image signal means, to the first value and setting the selection data of the other image signals to the second value when facsimile data is received by said facsimile means, and for supplying said image signals including said selection data to said printing means so that an image of said predetermined data items is printed in said color in accordance with the supplied image signal and an image of the other image signals is printed in black in accordance with the supplied image signals.

12. An image data processing apparatus according to claim 9, further comprising fourth color setting means for reading out image signals of a mesh pattern from a memory when facsimile data is received by said facsimile means, for setting selection data of each of the read image signals to the first value and setting the selection data of all of said image signals supplied from said image signal means, to the second value, and for supplying the read image signals of the mesh pattern and the image signals of the received facsimile data to said printing means so that an image of the read image signals is printed in said color on an entire sheet and an image of the received facsimile data is printed in black on said sheet in accordance with the supplied image signals.

13. An image data processing apparatus according to claim 9, wherein said printing means comprises marking means for printing a marking, indicating reception of the facsimile data, on said sheet in a different color other than black when the facsimile data is received by said facsimile means.

* * * * *